United States Patent
Kwon et al.

(10) Patent No.: US 7,865,549 B2
(45) Date of Patent: Jan. 4, 2011

(54) METHOD AND APPARATUS FOR TRANSMITTING DATA FRAME EFFICIENTLY IN COMMUNICATION NETWORK

(75) Inventors: Chang-yeul Kwon, Yongin-si (KR); Dong-hwi Roh, Seoul (KR); Guoping Fan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 11/599,338

(22) Filed: Nov. 15, 2006

(65) Prior Publication Data

US 2007/0110324 A1 May 17, 2007

Related U.S. Application Data

(60) Provisional application No. 60/736,325, filed on Nov. 15, 2005.

(30) Foreign Application Priority Data

Mar. 10, 2006 (KR) ............ 10-2006-0022723

(51) Int. Cl.
G06F 15/16 (2006.01)
(52) U.S. Cl. ............ 709/203; 709/201; 709/202; 709/230; 370/338
(58) Field of Classification Search ......... 709/201–203, 709/217, 230–236
See application file for complete search history.

(56) References Cited

U.S. PATENT DOCUMENTS

| | | | |
|---|---|---|---|
| 5,946,320 A | 8/1999 | Decker | |
| 6,151,696 A | 11/2000 | Miller et al. | |
| 7,103,065 B1 * | 9/2006 | Quigley et al. | 370/465 |
| 7,454,474 B2 * | 11/2008 | Choi | 709/207 |
| 2001/0030955 A1 * | 10/2001 | Lee et al. | 370/342 |
| 2001/0055319 A1 * | 12/2001 | Quigley et al. | 370/480 |
| 2002/0181680 A1 * | 12/2002 | Linder et al. | 379/106.02 |
| 2003/0214930 A1 * | 11/2003 | Fischer | 370/338 |
| 2003/0217168 A1 * | 11/2003 | Adachi et al. | 709/229 |
| 2004/0039744 A1 * | 2/2004 | Choi | 707/10 |
| 2004/0153909 A1 | 8/2004 | Lim et al. | |
| 2004/0177306 A1 * | 9/2004 | Hiraki | 714/748 |
| 2005/0111416 A1 * | 5/2005 | Ginzburg | 370/338 |
| 2005/0157715 A1 | 7/2005 | Hiddink et al. | |
| 2005/0219999 A1 * | 10/2005 | Kim et al. | 370/207 |
| 2005/0238054 A1 * | 10/2005 | Sharma | 370/473 |
| 2006/0034247 A1 * | 2/2006 | Gu et al. | 370/349 |
| 2006/0034274 A1 * | 2/2006 | Kakani et al. | 370/389 |
| 2006/0044967 A1 * | 3/2006 | Yamamoto | 369/47.1 |
| 2006/0161680 A1 * | 7/2006 | Balsevich | 709/245 |
| 2006/0206608 A1 * | 9/2006 | Naito et al. | 709/224 |
| 2006/0264734 A1 * | 11/2006 | Kimoto et al. | 600/407 |

* cited by examiner

Primary Examiner—Wing F Chan
Assistant Examiner—Razu A Miah
(74) Attorney, Agent, or Firm—Sughrue Mion, PLLC (57) ABSTRACT

A method and apparatus for transmitting a data frame in a communication network, such as a wireless local area network (WLAN), a power line communication (PLC) network, or the like. A transmitter forms one expansion frame using more than one frame, transmits more than one generated expansion frame to a receiver, requests a block acknowledgement (ACK) frame for the transmitted expansion frames, and, after receiving the block ACK frame, re-transmits an expansion frame having an error by changing a transmission parameter.

28 Claims, 9 Drawing Sheets

METHOD AND APPARATUS FOR TRANSMITTING DATA FRAME EFFICIENTLY IN COMMUNICATION NETWORK

CROSS-REFERENCES TO RELATED PATENT APPLICATION

This application claims the benefit of Korean Patent Application No. 10-2006-0022723, filed on Mar. 10, 2006, in the Korean Intellectual Property Office and U.S. Patent Application No. 60/736,325, filed on Nov. 15, 2005, in the U.S. Patents and Trademark Office, the disclosures of which are incorporated herein in their entirety by reference.

BACKGROUND OF THE INVENTION

1. Field of the Invention

Methods and apparatuses consistent with the present invention relate to a method and apparatus for transmitting data, and more particularly, to a method and apparatus for efficiently transmitting a data frame in a communication network.

2. Description of the Related Art

With the advent of ubiquitous networking and improvement in networks, studies have been carried out on various aspects of network technology. For example, a wireless network is advantageous because data is received and transmitted without using wires. However, when transmitting massive multimedia data, several apparatuses share and use the given wireless data resources. Accordingly, when competition between users is high, wireless data resources may be lost due to a collision of the wireless data resources during communication. Thus, the efficiency of the wireless network can be inferior compared to the efficiency of a wired network.

In order to reduce the number of collisions and loss of wireless data resources and to safely receive and transmit the wireless data resources, a wireless local area network (WLAN) uses a distributed coordination function (DCF) or a point coordination function (PCF), whereas a wireless personal area network (WPAN) uses a channel time allocation scheme.

Some problems of a wireless network can be solved by applying the above mentioned functions in the wireless network, but obstacles, such as multi-channel, fading, interference, etc., which interfere with the smooth reception/transmission of data still exist. Also, as the number of wireless networks increase, possibilities of a collision during data transmission and a loss of data increase. Accordingly, data needs to be re-transmitted, which adversely effects transmission speed in a wireless network. Specifically when a high quality of service (QoS) is required in order to transmit accurate data, such as audio/video data (A/V data), a method of re-transmitting data needs to be improved, for example, by reducing the number of re-transmissions, thereby securing available bandwidth as much as possible.

Figure 1:
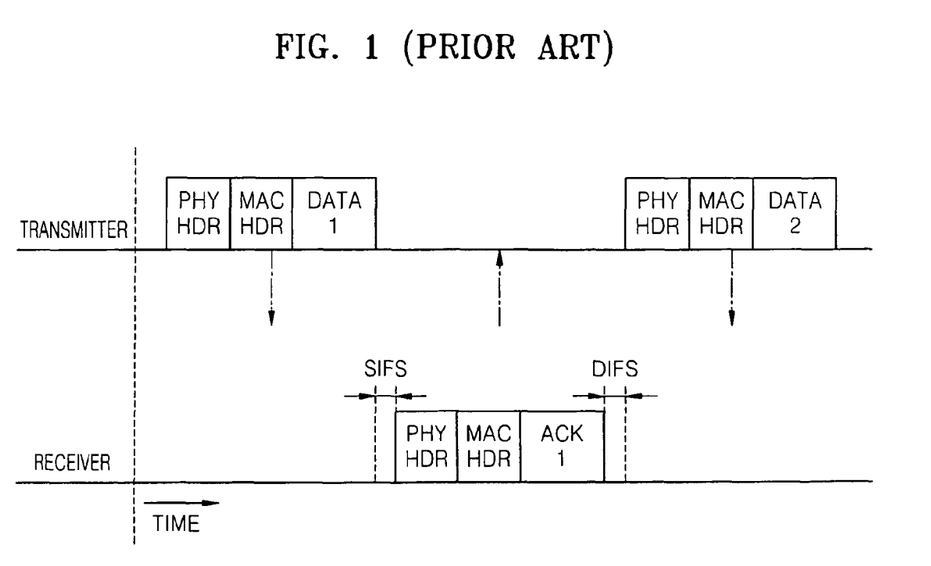
FIG. 1 is a diagram illustrating a frame transmission process in a conventional 802.11 wireless network.

FIG. 1 is a diagram illustrating a frame transmission process in a conventional wireless network.

Referring to FIG. 1, in a conventional IEEE 802.11 standard based wireless network, a transmitter generates headers for each layer using a media access control (MAC) layer and a physical (PHY) layer, and transmits a PHY header (HDR), a MAC HDR, and a data frame formed of data 1 to a receiver. The receiver accurately receives the above information after a short inter frame space (SIFS) has passed, according to the conventional IEEE 802.11 standard. When the receiver is unable to detect any errors in the received information, the received information is sent to an upper layer. Also, in order to show that the information has been received, the receiver transmits an acknowledgement (ACK) frame formed of the PHY HDR, the MAC HDR, and an ACK 1.

The transmitter, after receiving the ACK frame, transmits a following data frame formed of the PHY HDR, the MAC HDR, and data 2 to a receiver, after a DCF inter frame space (DIFS) has passed according to conventional IEEE 802.11 standard.

Figure 2:
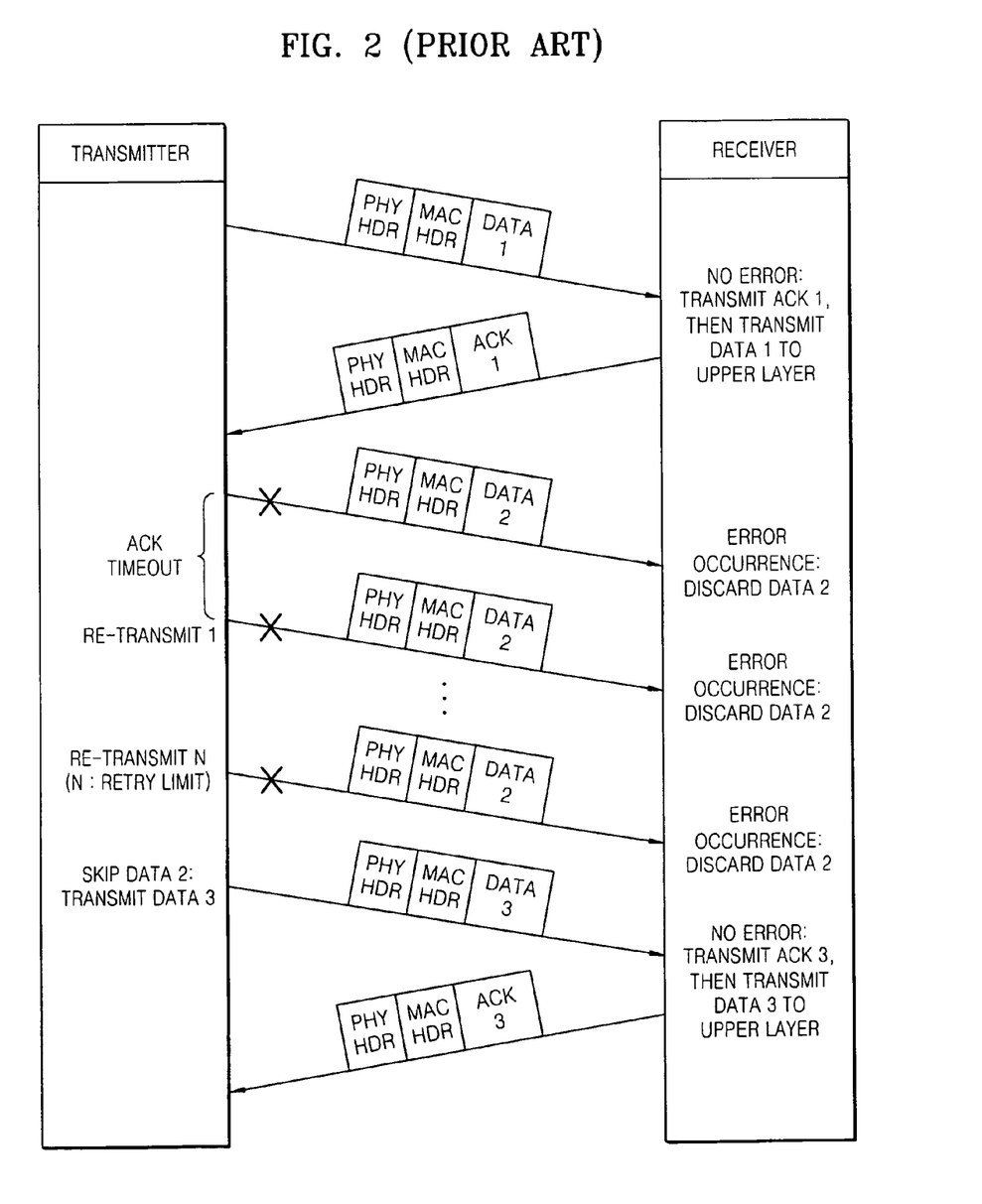
FIG. 2 is a diagram illustrating a processing method when the transmission of a frame has failed when using a conventional method of transmitting a frame.

FIG. 2 is a diagram illustrating a processing method when the transmission of a frame has failed when using a conventional method of transmitting a frame.

Referring to FIG. 2, a transmitter transmits a first frame including data 1 to a receiver. When data is successfully transmitted, the receiver transmits ACK 1 to the transmitter, as shown in FIG. 1, in order to confirm the successful data transmission and transmits data 1 to an upper layer of a MAC protocol. The transmitter which received ACK 1 then transmits a second frame including data 2 to the receiver. After transmitting the second frame, the transmitter starts a counter. When the counter stops and the transmitter has not received an ACK from the receiver for a period of time called ACK timeout, the transmitter regards that the transmission of data 2 failed, and so re-transmits the second frame to the receiver.

When the above process is repeated a predetermined <Retry Limit> number of times, but the receiver still has not responded, the transmitter skips data 2 and transmits a following data 3. The receiver, which received data 3, transmits data 3 to an upper layer when an error is not detected in data 3 and data 3 is received without any bug, and transmits ACK 3 to the transmitter.

Figure 3:
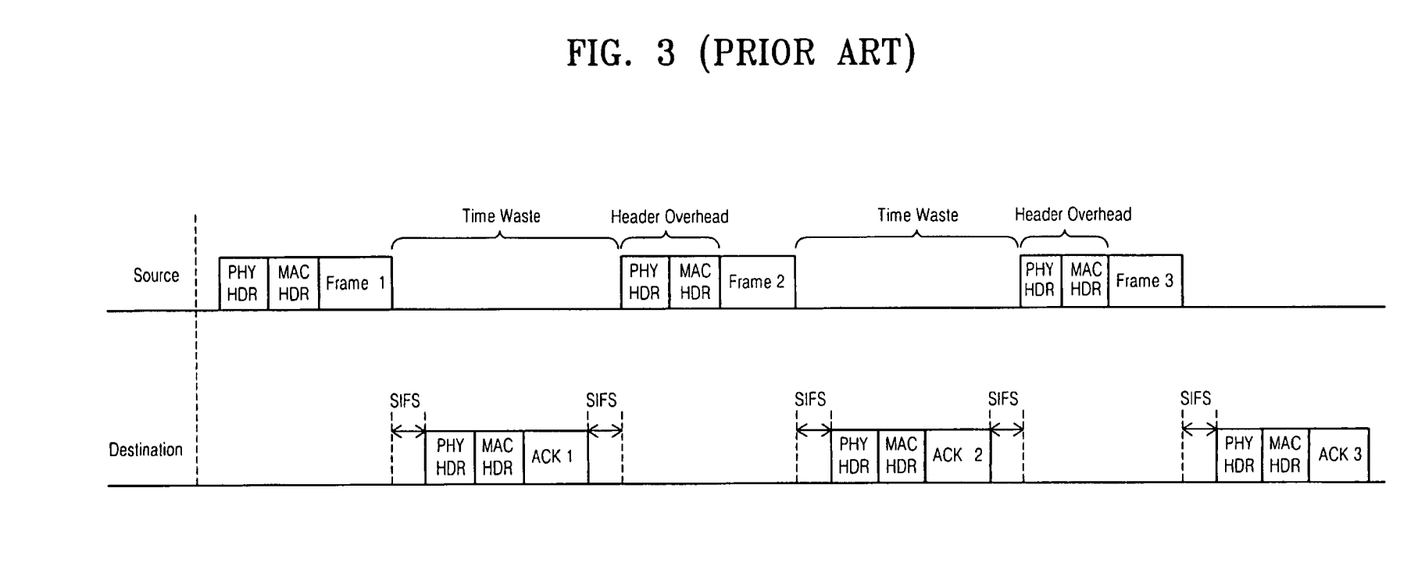
FIG. 3 is a diagram for describing problems in a conventional method of transmitting a frame.

As described, using the conventional method of transmitting a frame, unnecessary time is spent during the transmission of frames because whenever a transmitter transmits several frames, the transmitter needs to receive ACK frames for each frame. FIG. 3 is a diagram for describing problems in a conventional method of transmitting a frame.

As shown in FIG. 3, time is wasted because ACK frames have to be received for each data frame, data transmitting efficiency is low because the amount of data that needs to be transmitted is limited by a MAC HDR and a PHY HDR added to each frame, and a relatively big overhead is generated because of the MAC HDR and the PHY HDR when the length of a data that needs to be transmitted, such as A/V stream data, is small. For example, in the IEEE 802.11 standard, when a MPEG transport stream of 188 bytes is transmitted, the length of the MAC HDR included in the data frame is 30 bytes, and the time length of the PHY HDR is 20 μsec, thereby a bigger overhead is generated compared to data that is to be actually transmitted. Also, the problems become more serious as the number of re-transmissions increases. On the other hand, these problems not only occur in a wireless network, but also in similar communication networks, such as power line communication (PLC) networks, etc.

SUMMARY OF THE INVENTION

According to an aspect of the present invention, there is provided a method of transmitting a frame, including: generating a plurality of expansion frames, each expansion frame including a plurality of frame body fields; transmitting the generated expansion frames and requesting one acknowledgement (ACK) frame in response to the transmitted expansion frames; and re-transmitting an expansion frame having an error among the transmitted expansion frames when the ACK frame received in response to the request indicates that the expansion frame has an error.

The expansion frame may include cyclic redundancy check (CRC) information which enables a receiver to detect errors for each frame body field.

Also, the re-transmitting of the expansion frame may be performed by changing a transmission parameter of the expansion frame based on the number of error occurrences of the expansion frame and/or a data processing capability of the receiver. Here, the changing of the transmission parameter includes changing transmission power and/or a transmission rate (Tx rate) of the expansion frame. On the other hand, in the re-transmitting of the expansion frame having an error, the transmission parameter may be changed based on a channel state.

At this time, frame exchange between a transmitter and a receiver may be performed through a wireless local area network (WLAN) or a power line communication (PLC) network.

According to another aspect of the present invention, there is provided a computer readable medium having recorded thereon a program to execute the method described above.

According to another aspect of the present invention, there is provided an apparatus for transmitting a frame, including: an expansion frame generator which generates a plurality of expansion frames, each expansion frame including a plurality of frame body fields; a transmitting unit which transmits the generated expansion frames to a receiver; an acknowledgement (ACK) requester which requests one ACK frame for the transmitted expansion frames; and a re-transmitting controller which controls the transmitting unit, to re-transmit an expansion frame having an error among the transmitted expansion frames by referring to the ACK frame received in response to the request.

The expansion frame generator may insert CRC information which enables the receiver to detect errors for each frame body field. The re-transmitting controller may change a transmission parameter of the expansion frame based on the number of error occurrences of the expansion frame and/or a data processing capability of the receiver.

According to another aspect of the present invention, there is provided a method of receiving a frame, including: receiving a plurality of expansion frames, each expansion frame including a plurality of frame body fields; determining an expansion frame among the received expansion frames which needs to be re-transmitted; and transmitting one ACK frame including information which specifies the expansion frame that needs to be re-transmitted in response to a request for the one ACK frame in response to the received expansion frames.

Here, an expansion frame, having an error in at least one frame body field, among the received expansion frames may be determined as being the expansion frame which needs to be retransmitted.

According to another aspect of the present invention, there is provided a computer readable medium having recorded thereon a program to execute the method described above.

According to another aspect of the present invention, there is provided an apparatus for receiving a frame, including: a receiving unit which receives a plurality of expansion frames, each expansion frame including a plurality of frame body fields; a re-transmission determiner, which determines an expansion frame among the received expansion frames which needs to be re-transmitted; and an ACK processor which transmits one ACK frame including information which specifies the expansion frame that needs to be re-transmitted in response to a request for the one ACK frame in response to the received expansion frames.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Hereinafter, the present invention will be described more fully with reference to the accompanying drawings, in which exemplary embodiments of the invention are shown.

The present exemplary embodiment provides a method and apparatus for transmitting a data frame in a communication network which can improve overall throughput and secure stable transmission by reducing time wastage due to ACK frames received for each frame, and an overhead due to the size of headers added to each frame.

Figure 4:
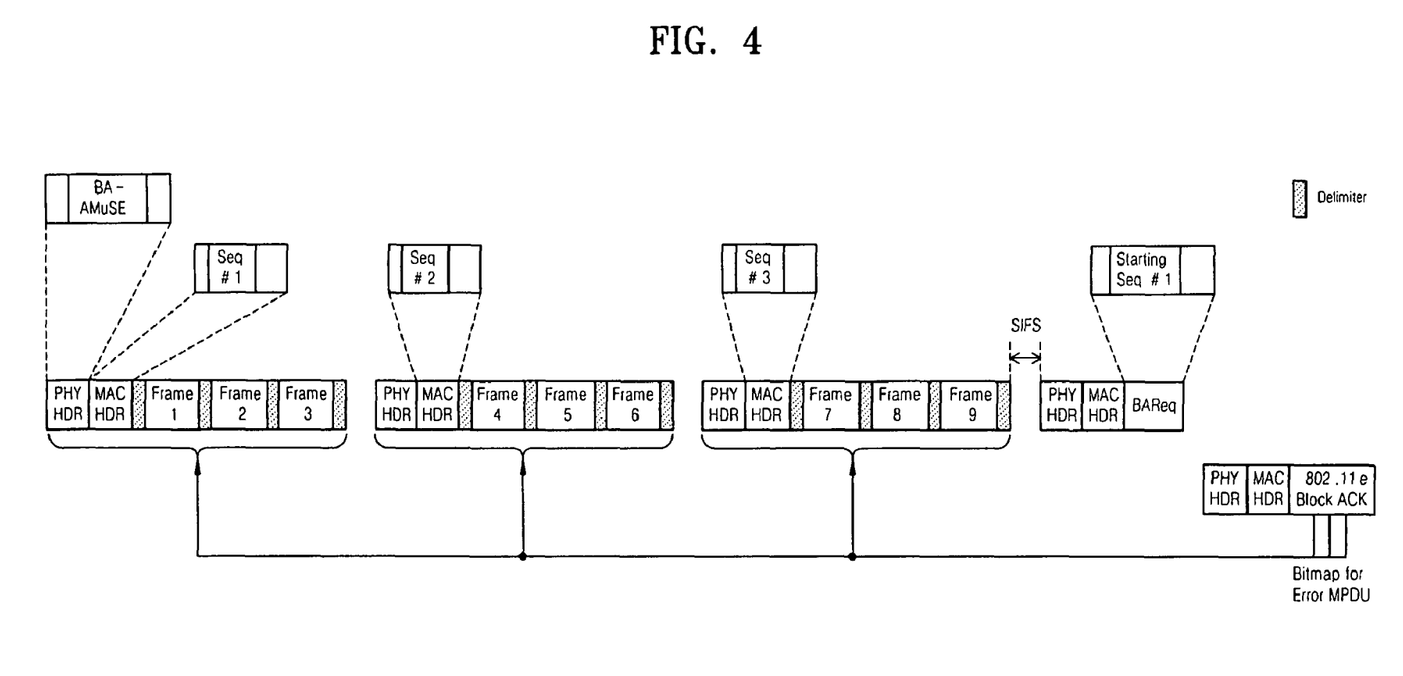
FIG. 4 is a diagram for briefly describing a principle of a method of transmitting a frame according to an exemplary embodiment of the present invention.

FIG. 4 is a diagram for briefly describing a principle of a method of transmitting a frame according to an exemplary embodiment of the present invention.

Referring to FIG. 4, a transmitter generates an expansion frame including a plurality of frames and continuously transmits a plurality of expansion frames without receiving an acknowledge (ACK) frame for each expansion frame. Accordingly, the expansion frame is a frame including a plurality of payload fields, that is, a plurality of frame body fields. In each frame body field, one sub-frame, that is, a MAC (media access control) service data unit (MSDU) which is transmitted from a layer that is higher than a MAC layer to the MAC layer, is stored. In the present exemplary embodiment of the invention, one expansion frame has three sub-frames. The expansion frame, in addition to the frame body field, includes a physical (PHY) header, a MAC header, and a delimiter. The delimiter may include sub-frame numbers to classify each sub-frame, checksum information to detect an error, etc. On the other hand, the MAC header includes a sequence number, which is a serial number of expansion frames and the PHY header includes information (Block ACK-Aggregated Multimedia Streaming Enhancement (BA-AMuSE)) which enables the receiver to determine whether a received frame is an expansion frame.

After transmitting the plurality of expansion frames, the transmitter transmits a block acknowledgement (BA) request frame to check whether the transmitted expansion frames have been successfully received. The receiver, upon receiving the BA request frame, transmits a block ACK frame including information in bitmap form. The information in bitmap form shows whether each of the three expansion frames shown in FIG. 4 have been received successfully. Accordingly, the transmitter, upon receiving the block ACK frame, can recognize an expansion frame which needs to be re-transmitted by referring to the information in bitmap form.

Figure 5:
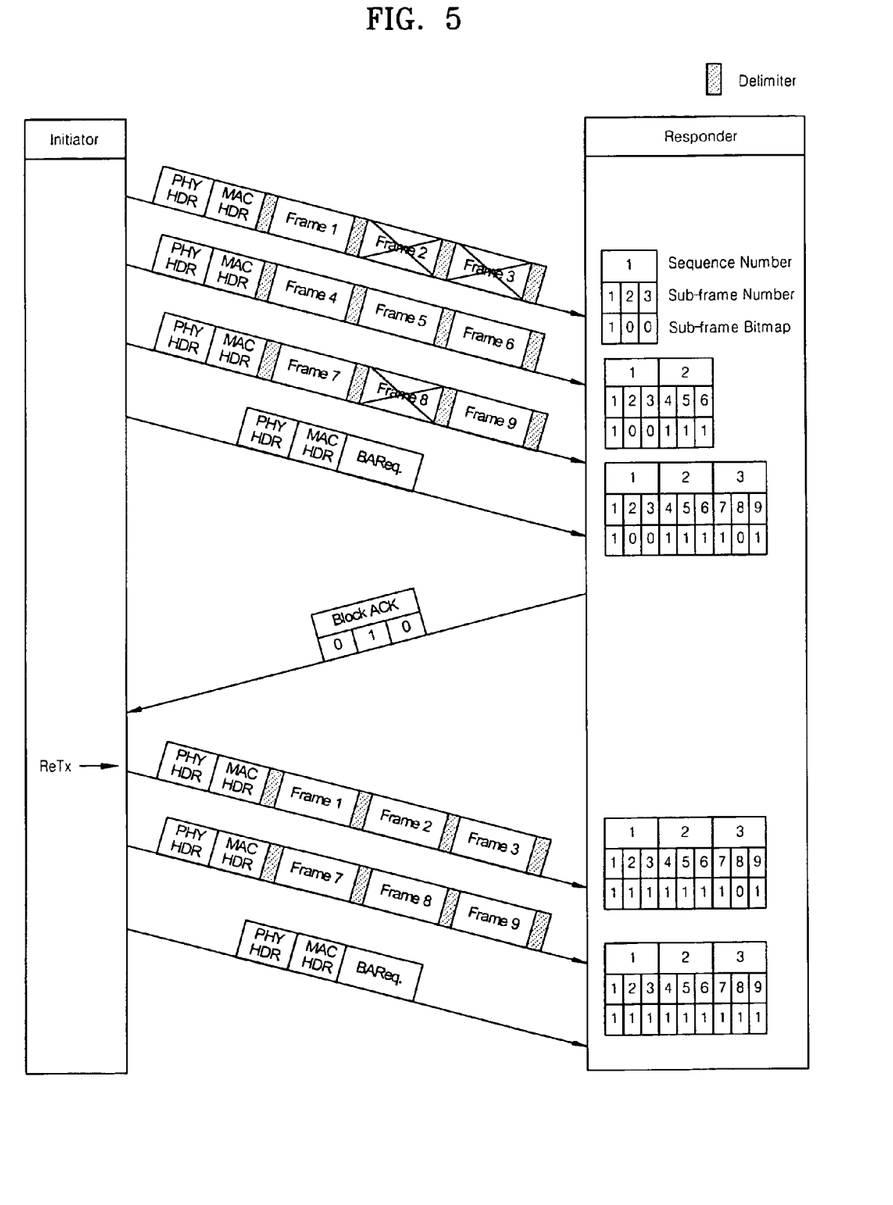
FIG. 5 is a detailed diagram illustrating a method of transmitting a frame according to an exemplary embodiment of the present invention.

FIG. 5 is a detailed diagram illustrating a method of transmitting a frame according to an exemplary embodiment of the present invention.

A transmitter (initiator) generates and transmits three expansion frames in sub-frames 1 through 9. Here, it is presumed that sub-frames 2 and 3 have errors in a first sequence, all sub-frames are successfully transmitted in a second sequence, and a sub-frame 8 has an error in a third sequence.

First, since sub-frames 2 and 3 have errors in the first sequence, a receiver (responder) does not transmit sub-frame 1 to an upper layer but stores it in a buffer, and prepares a bitmap. As shown in FIG. 5, the receiver according to the current exemplary embodiment of the present invention records 1 in a bit of a sub-frame having no errors, records 0 in bits of the remaining sub-frames having errors, and stores the received sub-frames in a buffer after preparing the bitmap.

The receiver prepares bitmaps for the remaining expansion frames using the same method, and then receives a block ACK request frame in order to specify an expansion frame, which is to be re-transmitted, by referring to the prepared bitmaps. When an error occurs in at least one sub-frame, the receiver according to an exemplary embodiment of the present invention considers it as a transmission failure of all expansion frames and requests the transmitter to re-transmit all expansion frames including the sub-frame having an error. Accordingly, the receiver requests to re-transmit a first expansion frame and a third expansion frame, and for this, information in bitmap form, which is formed of 3 bits, is inserted into the block ACK frame as shown in FIG. 5, and then the block ACK frame is transmitted to the transmitter.

The transmitter, upon receiving the block ACK frame, re-transmits the first expansion frame and the third expansion frame to the receiver by referring to the information in bitmap form included in the block ACK frame. At this time, in order to prevent an error from occurring again in the same expansion frame, the transmitter may change its transmission parameter before the re-transmission occurs. Here, the transmission parameter may be transmission power, a modulation system (Tx rate), etc., and the transmitter sets up a suitable transmission parameter based on a channel state or frame processing capability of the receiver (for example, whether the receiver is a multi input multi output (MIMO) device).

When all sub-frames are received successfully by re-transmitting them, the receiver sets up bits of all the sub-frames to be 1 in the bitmap. Since all the bits in the bitmap have been set up to be 1, a MAC layer of the receiver transmits all data stored in the buffer to the upper layer. According to another exemplary embodiment of the present invention, when all the bits are not set up to be 1 by performing the re-transmission even though a predetermined period of time has passed, the receiver may transmit all data stored in the buffer to the upper layer despite the error occurrence.

The receiver does not store all sub-frames of the expansion frame received during the re-transmission in the buffer, but only stores a sub-frame having an error from the previous transmission. This is due to the fact that when the receiver stores all the sub-frames of the re-transmitted expansion frame in the buffer and there is a sub-frame which was successfully received in the previous transmission but has an error in the re-transmission, successfully received data is changed with data having an error.

Figure 6:
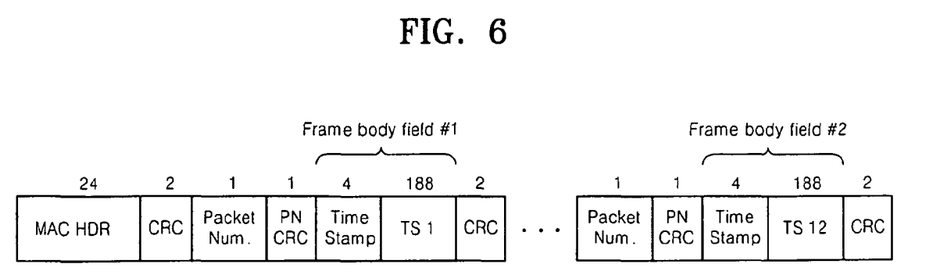
FIG. 6 is a structural diagram of a media access control (MAC) frame according to an exemplary embodiment of the present invention.

FIG. 6 is a structural diagram of a MAC frame according to an exemplary embodiment of the present invention.

As shown in FIG. 6, the MAC frame according to the current exemplary embodiment of the present invention includes a cyclic redundancy check (CRC) field recorded with a MAC header and CRC information which is used to check an error occurrence so as to determine whether a receiver has successfully received the MAC header, a packet number field recorded with a packet number, which is a serial number of a sub-frame, a packet number (PN) CRC field recorded with CRC information so as to determine whether the receiver has successfully received the packet number, a frame body field recorded with a sub-frame, a CRC field recorded with CRC information which is used to determine whether the receiver has successfully received the sub-frame, etc. According to the current exemplary embodiment of the present invention, one sub-frame is formed of a transmission stream TS and a time stamp, and 12 sub-frames form one expansion frame.

Figure 7:
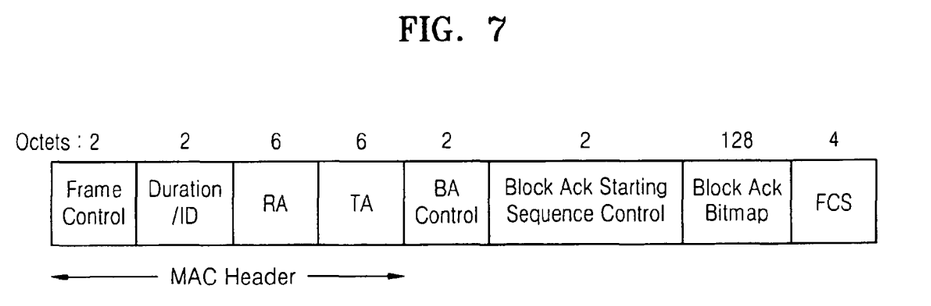
FIG. 7 is a structural diagram of a block acknowledgement (ACK) frame.

FIG. 7 is a structural diagram of a block ACK frame transmitted from a receiver to a transmitter.

As shown in FIG. 7, the block ACK frame includes a MAC header, a BA control field, a block ACK starting sequence control field, a block ACK bitmap field, and a frame check sequence (FCS) field. The MAC header includes a frame control field, a duration/ID field, an RA field recorded with a receiver address, and a TA field recorded with a transmitter address.

Information in bitmap form recorded on the block ACK bitmap field of the block ACK frame according to the current exemplary embodiment of the present invention specifies an expansion frame that is needed to be re-transmitted from among received expansion frames. That is, each bit of the bitmap recorded on the block ACK bitmap field sequentially shows whether each of the received expansion frames has been successfully received. For example, when a bit is 1, it has been successfully received, and when a bit is 0, it has an error.

Figure 8:
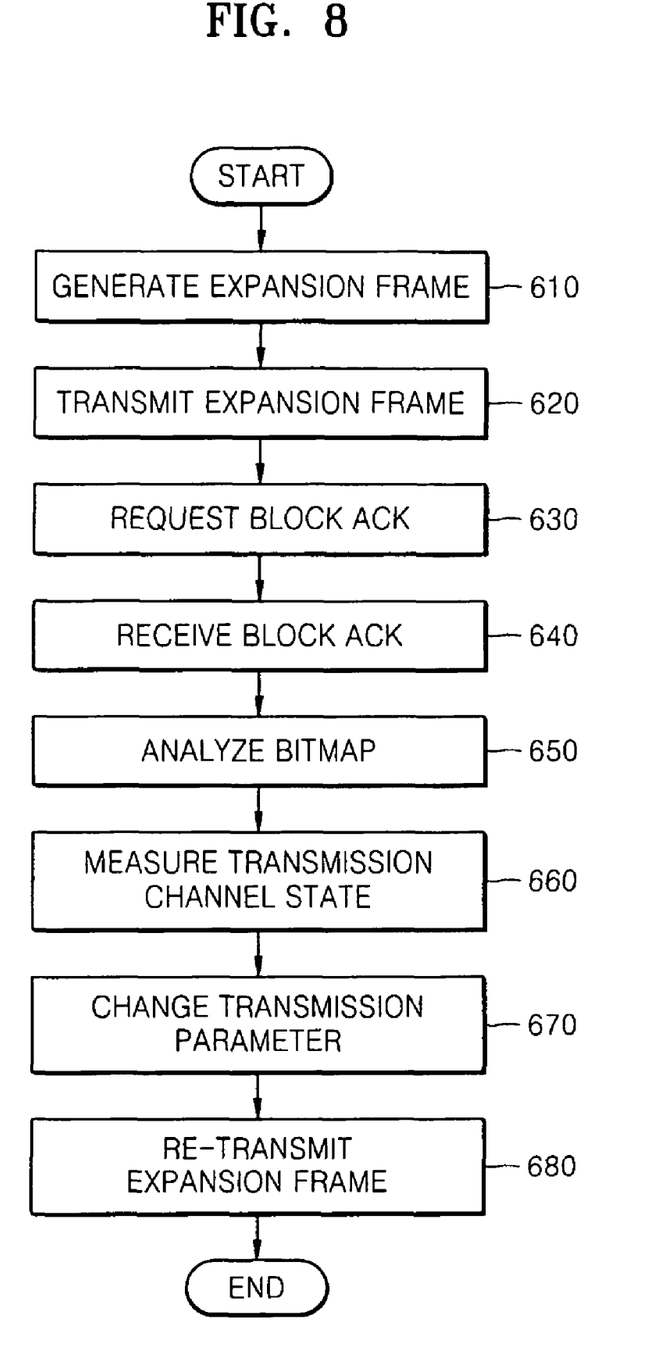
FIG. 8 is a flowchart illustrating the transmission of a frame in a transmitter according to an exemplary embodiment of the present invention.

FIG. 8 is a flowchart illustrating the transmission of a frame in a transmitter according to an exemplary embodiment of the present invention.

The transmitter generates an expansion frame formed of a plurality of sub-frames in operation 610. Here, the sub-frame is a MSDU received from an external port or an upper layer of MAC layer. As described above, one sub-frame is stored in one frame body field.

Next, the transmitter transmits a plurality of expansion frames to a receiver in operation 620, and requests a block ACK frame for the transmitted expansion frames to the receiver in operation 630. When the transmitter receives the block ACK frame from the receiver in operation 640 in response to the request, an expansion frame, which is requested to be re-transmitted due to an error, from among the transmitted expansion frames is recognized by referring to information in bitmap form included in the block ACK frame in operation 650.

The transmitter measures a transmission channel state to prevent the re-occurrence of the an error in operation 660, changes a transmission parameter, such as transmission power, or the like, based on the result of measurement in operation 670, and re-transmits the expansion frame which failed to be transmitted by applying the changed transmission parameter in operation 680.

According to the current exemplary embodiment, the transmitter changes the transmission parameter based on the channel state during re-transmission, but a suitable transmission parameter can be selected based on the frame transmission/reception capability of the receiver, the number of error occurrences of the corresponding expansion frame, or the like.

Figure 9:
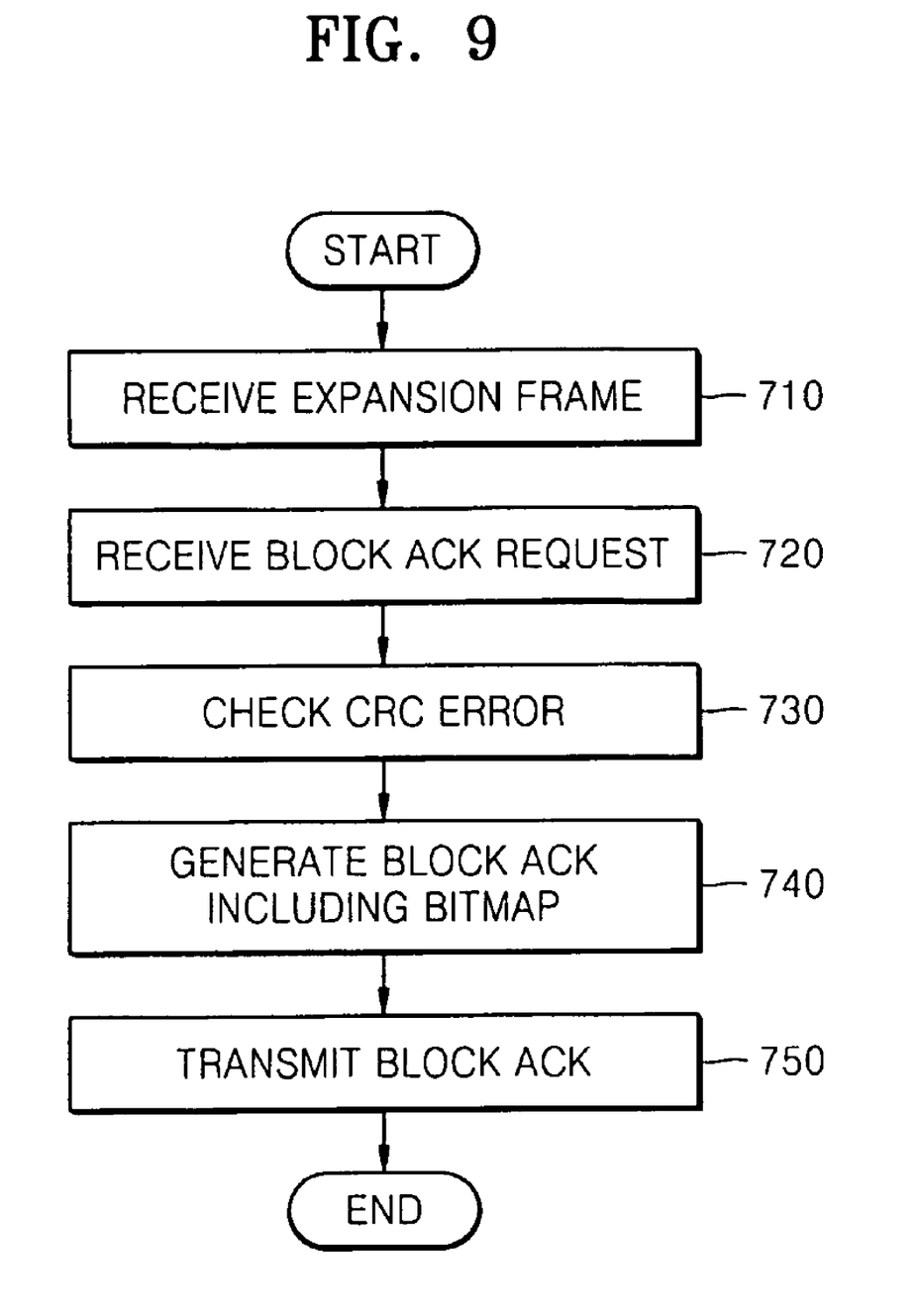
FIG. 9 is a flowchart illustrating a processing method of a received frame in a receiver according to an exemplary embodiment of the present invention.

FIG. 9 is a flowchart illustrating a processing method of a received frame in a receiver according to an exemplary embodiment of the present invention.

The receiver receives a plurality of expansion frames, each expansion frame including a plurality of frame body fields, from a transmitter in operation 710. Next, the receiver is requested to transmit a block ACK frame for the received expansion frames in operation 720. The receiver checks an error using a CRC method on each sub-frame of the received plurality of expansion frames in operation 730. The CRC method is used to check an error of the received frame in the current exemplary embodiment, but the method is not limited thereto. The receiver prepares a bitmap on each sub-frame based on the error occurrence, and inserts information in bitmap form applying the prepared bitmap in the block ACK frame in operation 740. Then the receiver transmits the block ACK frame to the transmitter in operation 750, wherein the information in bitmap form included in the block ACK frame includes information on which expansion frame has an error. That is, the receiver according to the current exemplary embodiment of the present invention requests the transmitter to re-transmit the entire expansion frame which includes a sub-frame having an error, when at least one sub-frame included in one expansion frame has an error. However, according to another exemplary embodiment of the present invention, the receiver may request the transmitter to only re-transmit the sub-frame having an error.

Figure 10:
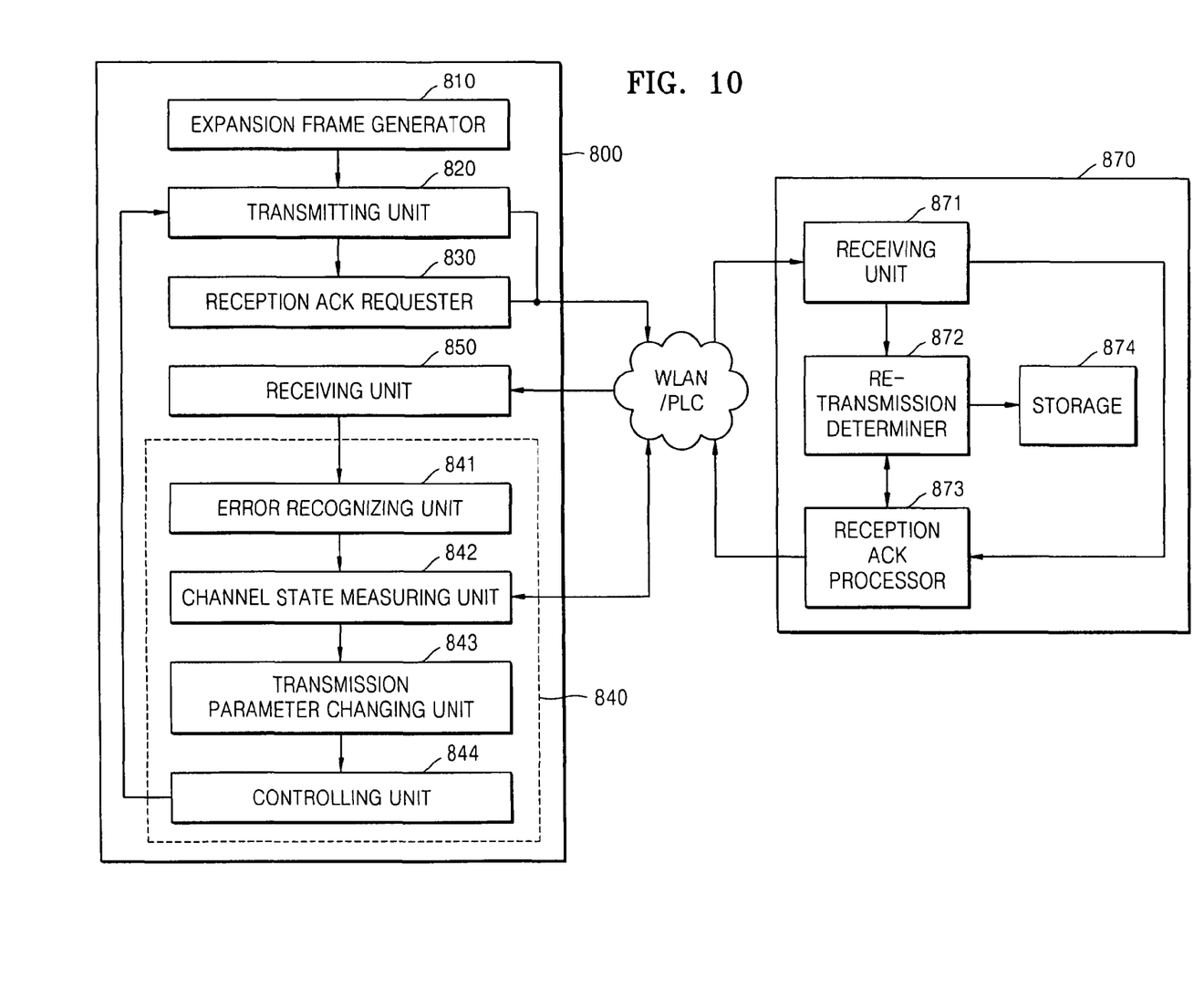
FIG. 10 is a structural diagram of a transmitter and a receiver according to an exemplary embodiment of the present invention.

FIG. 10 is a structural diagram of a transmitter 800 and a receiver 870 according to an exemplary embodiment of the present invention.

Referring to FIG. 10, the transmitter 800 according to the current exemplary embodiment includes an expansion frame generator 810, a transmitting unit 820, an ACK requester 830, a receiving unit 850, and a re-transmitting controller 840.

The expansion frame generator 810 generates an expansion frame including a plurality of frame body fields, wherein the expansion frame includes information which enables a receiver 870 to detect an error in a sub-frame stored in each frame body field. The transmitting unit 820 transmits or re-transmits the expansion frame through a communication network.

The ACK requester 830 requests the receiver 870 to transmit a block ACK frame for the plurality of expansion frames, and the receiving unit 850 receives the block ACK frame transmitted from the receiver 870 in response to the request from the ACK requester 830.

The re-transmitting controller 840 re-transmits an expansion frame, which has an error, from among the transmitted expansion frames by referring to the received block ACK frame. The re-transmitting controller 840 includes an error recognizing unit 841, a channel state measuring unit 842, a transmission parameter changing unit 843, and a controlling unit 844.

The error recognizing unit 841 recognizes whether re-transmission is requested due to an error in an expansion frame by analyzing the information in bitmap form included in the received block ACK frame. The transmission parameter changing unit 843 changes a transmission parameter of the expansion frame which is to be re-transmitted, in order to prevent an error from occurring again. Here, the transmission parameter may be transmission power (Tx power), a modulation system (Tx rate), or the like. As described above, the transmission parameter can be changed by referring to a channel state measured by the channel state measuring unit 842 or can be suitably selected based on the frame transmission/reception capability of the receiver 870 or the number of error occurrences in the re-transmitted expansion frame. The controlling unit 844 re-transmits an expansion frame, specified in the block ACK frame, to the receiver 870 by applying the changed transmission parameter.

Next, the receiver 870 includes a receiving unit 871, a re-transmission determiner 872, an ACK processor 873, and a storage 874. The receiving unit 871 receives an expansion frame transmitted from the transmitter 800, transmits the expansion frame to the re-transmission determiner 872, receives a block ACK request frame, and transmits the block ACK request frame to the ACK processor 873.

The re-transmission determiner 872 detects an error in each frame body field of the received expansion frames and prepares a bitmap based on the result of the error detection. Also, the re-transmission determiner 872, upon receiving the block ACK request frame from the transmitter 800, determines an expansion frame having an error in at least one frame body field that is to be re-transmitted based on the prepared bitmap. Also, when the expansion frame which is to be re-transmitted is determined, the re-transmission determiner 872 generates information in bitmap form to inform the transmitter 800 which expansion frame to re-transmit.

The storage 874 stores a sub-frame of the received expansion frame in a buffer, and when the re-transmitted expansion frame is received, the storage 874 selectively stores sub-frames, which had errors in the previous transmission, from among the sub-frames of the re-transmitted expansion frame in the buffer.

The ACK processor 873, upon receiving the block ACK request frame from the transmitter 800, receives the information in bitmap form from the re-transmission determiner 872 in order to insert the information in the block ACK frame, thereby transmitting the block ACK frame to the transmitter 800.

In regards to communication between the transmitter 800 and the receiver 870, a communication network may be a wireless network, such as WLAN, or a PLC network using a protocol having the same principle. Accordingly, the transmitting unit 820 and the receiving unit 850 of the transmitter 800, and the receiving unit 871 and the ACK processor 873 of the receiver 870, which transmit/receive a frame through a communication network, can be connected by means of a radio frequency (RF) interface, but also can be connected by means of a wired-side interface used in a PLC.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media.

According to the present exemplary embodiment of the invention, a transmitter requests a block ACK frame after transmitting a plurality of expansion frames, each expansion frame including a plurality of sub-frames. Accordingly, time wasting caused by frequent transmissions of ACK frames can be prevented, an overhead caused by adding a header in each frame can be reduced, and data can be stably transmitted by changing a transmission parameter when re-transmitting a frame having an error.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of transmitting a frame, comprising:
   generating a plurality of expansion frames, each expansion frame including a plurality of MAC Service Data Units (MSDUs);
   transmitting the generated expansion frames and requesting only a single acknowledgement (ACK) frame be transmitted in response to the transmitted plurality of expansion frames; and
   re-transmitting an expansion frame selected from the transmitted expansion frames by changing a transmission parameter of the expansion frame when the ACK frame received in response to the request indicates that the expansion frame has an error,
   wherein the re-transmitting of the expansion frame comprises:
   recognizing the expansion frame having an error among the transmitted expansion frames by referring to the ACK frame received in response to the request;
   measuring a transmission channel state; and
   re-transmitting the expansion frame having an error after changing a transmission parameter based on the measured transmission channel state.

2. The method of claim 1, wherein the expansion frame includes cyclic redundancy check (CRC) information which enables a receiver to detect errors for each MSDU.

3. The method of claim 1, wherein the re-transmitting of the expansion frame is performed by changing a transmission parameter of the expansion frame based on the number of error occurrences of the expansion frame and/or a data processing capability of the receiver.

4. The method of claim 3, wherein the changing a transmission parameter includes changing transmission power and/or a transmission rate (Tx rate) of the expansion frame.

5. The method of claim 1, wherein the changing a transmission parameter includes changing transmission power (Tx Power) and/or a transmission rate (Tx rate) of the expansion frame.

6. The method of claim 1, wherein the expansion frame is transmitted through a wireless local area network (WLAN).

7. The method of claim 1, wherein the expansion frame is transmitted using a power line communication (PLC) channel.

8. A non-transitory computer readable storage medium having recorded thereon a program, which causes a computer to execute the method comprising:
   generating a plurality of expansion frames, each expansion frame including a plurality of MAC Service Data Units (MSDUs);
   transmitting the generated expansion frames and requesting only a single acknowledgement (ACK) frame be transmitted in response to the transmitted plurality of expansion frames; and
   re-transmitting an expansion frame selected from the transmitted expansion frames by changing a transmission parameter of the expansion frame when the ACK frame received in response to the request indicates that the expansion frame has an error,
   wherein the re-transmitting of the expansion frame comprises:
   recognizing the expansion frame having an error among the transmitted expansion frames by referring to the ACK frame received in response to the request;
   measuring a transmission channel state; and
   re-transmitting the expansion frame having an error after changing a transmission parameter based on the measured transmission channel state.

9. An apparatus for transmitting a frame, comprising:
   an expansion frame generator which generates a plurality of expansion frames, each expansion frame including a plurality of MAC Service Data Units (MSDUs);
   a transmitting unit which transmits the generated expansion frames to a receiver;
   an acknowledgement (ACK) requester which requests only a single ACK frame be transmitted for the plurality of transmitted expansion frames; and
   a re-transmitting controller which changes a transmission parameter of an expansion frame having an error among the transmitted expansion frames by referring to the ACK frame received in response to the request and controls the transmitting unit to re-transmit the expansion frame,
   wherein the re-transmitting controller comprises:
   an error recognizing unit which recognizes the expansion frame having an error among the transmitted expansion frames by referring to the ACK frame received in response to the request;
   a channel state measuring unit which measures a transmission channel state;
   a transmission parameter changing unit which changes a transmission parameter of the expansion frame having an error based on the measured transmission channel state; and
   a controlling unit which controls the transmitter to re-transmit the expansion frame having an error based on the changed transmission parameter.

10. The apparatus of claim 9, wherein the expansion frame generator inserts CRC information which enables the receiver to detect errors for each MSDU.

11. The apparatus of claim 9, wherein the re-transmitting controller changes a transmission parameter of the expansion frame based on the number of error occurrences of the expansion frame and/or a data processing capability of the receiver.

12. The apparatus of claim 11, wherein the re-transmitting controller changes transmission power (Tx Power) and/or a transmission rate (Tx rate) of the expansion frame.

13. The apparatus of claim 9 wherein the transmission parameter changing unit changes transmission power (Tx Power) and/or a transmission rate (Tx rate) of the expansion frame having an error.

14. The apparatus of claim 9, wherein the transmitting unit transmits the expansion frame through a WLAN.

15. The apparatus of claim 9, wherein the transmitting unit transmits the expansion frame through a PLC channel.

16. A method of receiving a frame, comprising:
   receiving a plurality of expansion frames, each expansion frame including a plurality of MAC Service Data Units (MSDUs);
   determining an expansion frame among the received expansion frames which needs to be re-transmitted; and transmitting only a single ACK frame including information which specifies the expansion frame that needs to be re-transmitted in response to a request for the single ACK frame to be transmitted in response to the received plurality of expansion frames;

receiving the expansion frame which is re-transmitted based on a changed transmission parameter in response to the single ACK frame;

storing data which is recorded in each MSDU of the received expansion frames in a buffer; and storing, in the buffer, data only recorded in an error MSDU among the MSDUs of the re-transmitted expansion frames when the re-transmitted expansion frame is received, the error MSDU having had an error during transmission before re-transmission.

17. The method of claim 16, wherein an expansion frame, from among the received expansion frames, is determined to be the expansion frame which needs to be retransmitted, the expansion frame having an error in at least one MSDU.

18. The method of claim 17, wherein the error is determined by referring to CRC information for each MSDU included in the received expansion frames.

19. The method of claim 16, wherein the information, which specifies the expansion frame that needs to be re-transmitted, is in bitmap form.

20. The method of claim 16, wherein the expansion frames and the ACK frame are transmitted through a WLAN.

21. The method of claim 16, wherein the expansion frames and the ACK frame are transmitted through a PLC channel.

22. A non-transitory computer readable storage medium having recorded thereon a program, which causes a computer to execute the method comprising:

receiving a plurality of expansion frames, each expansion frame including a plurality of MAC Service Data Units (MSDUs);

determining an expansion frame among the received expansion frames which needs to be re-transmitted;

transmitting only a single ACK frame including information which specifies the expansion frame that needs to be re-transmitted in response to a request for the single ACK frame to be transmitted in response to the received plurality of expansion frames;

receiving the expansion frame which is re-transmitted based on a changed transmission parameter in response to the single ACK frame storing data which is recorded in each MSDU of the received expansion frames in a buffer; and storing, in the buffer, data only recorded in an error MSDU among the MSDUs of the re-transmitted expansion frames when the re-transmitted expansion frame is received, the error MSDU having had an error during transmission before re-transmission.

23. An apparatus for receiving a frame, comprising:

a receiving unit which receives a plurality of expansion frames, each expansion frame including a plurality of MAC Service Data Units (MSDUs);

a re-transmission determiner, which determines an expansion frame which needs to be re-transmitted among the received expansion frames;

an ACK processor which transmits only a single ACK frame including information which specifies the expansion frame that needs to be re-transmitted in response to a request for the single ACK frame which is transmitted in response to the received plurality of expansion frames; and a storage unit which stores data which is recorded in each MSDU of the received expansion frames in a buffer, and stores, in the buffer, data only recorded in an error MSDU from among the MSDUs of the re-transmitted expansion frames when the re-transmitted expansion frame is received, the error MSDU having had an error during transmission before the re-transmission, wherein the receiving unit receives the expansion frame which is re-transmitted based on a changed transmission parameter in response to the single ACK frame.

24. The apparatus of claim 23, wherein the re-transmission determiner determines an expansion frame, from among the received expansion frames, as being the expansion frame which needs to be re-transmitted, the expansion frame which needs to be re-transmitted having an error in at least one MSDU.

25. The apparatus of claim 24, wherein the re-transmission determiner determines the error by referring to CRC information for each MSDU included in the received expansion frames.

26. The apparatus of claim 23, wherein the information, which specifies the expansion frame that needs to be re-transmitted, is in bitmap form.

27. The apparatus of claim 23, wherein the receiving unit receives the expansion frame through a WLAN, and the ACK processor transmits the ACK frame through the WLAN.

28. The apparatus of claim 23, wherein the receiving unit receives the expansion frame through a PLC channel, and the ACK processor transmits the ACK frame through the PLC channel.

* * * * *